United States Patent
Nakazawa et al.

(10) Patent No.: US 7,227,693 B2
(45) Date of Patent: Jun. 5, 2007

(54) ZOOM LENS AND PROJECTION DISPLAY DEVICE USING THE ZOOM LENS

(75) Inventors: Kimiaki Nakazawa, Kitakatsushika-gun (JP); Fumio Watanabe, Kumagaya (JP)

(73) Assignee: Fujinon Corporation, Saitama (JP)

( * ) Notice: Subject to any disclaimer, the term of this patent is extended or adjusted under 35 U.S.C. 154(b) by 68 days.

(21) Appl. No.: 11/172,851

(22) Filed: Jul. 5, 2005

(65) Prior Publication Data

US 2006/0056043 A1    Mar. 16, 2006

(30) Foreign Application Priority Data

Aug. 30, 2004  (JP) ............................. 2004-250953

(51) Int. Cl.
*G02B 15/14* (2006.01)
(52) U.S. Cl. ...................................... 359/676; 359/683
(58) Field of Classification Search ................ 359/676, 359/683
See application file for complete search history.

(56) References Cited

U.S. PATENT DOCUMENTS

| | | | |
|---|---|---|---|
| 5,416,639 A * | 5/1995 | Yamanashi | ................... 359/683 |
| 6,515,803 B2 | 2/2003 | Hirose | |
| 6,809,877 B2 | 10/2004 | Nagahara | |
| 7,009,776 B2 * | 3/2006 | Wada | .......................... 359/649 |

FOREIGN PATENT DOCUMENTS

| | | |
|---|---|---|
| JP | 2000-137165 | 5/2000 |
| JP | 2001-91829 | 4/2001 |
| JP | 2001-100100 | 4/2001 |
| JP | 2002-72094 | 3/2002 |

* cited by examiner

*Primary Examiner*—Ricky Mack
*Assistant Examiner*—William C Choi
(74) *Attorney, Agent, or Firm*—Arnold International; Jon W. Henry; Bruce Y. Arnold

(57) ABSTRACT

A zoom lens for a projection display device includes, in order from the enlarging side, a first lens group having negative refractive power and that is stationary during zooming, second and third lens groups having positive refractive power, a fourth lens group that has refractive power that is much weaker in absolute value than the refractive powers of the other lens groups, and a fifth lens group having positive refractive power and that is stationary during zooming. The second, third, and fourth lens groups move with coordinated movements continuously toward the enlarging side during zooming from the wide-angle end to the telephoto end of the zoom range. The zoom lens satisfies certain conditions related to focal lengths of the zoom lens and lens groups and distances along the optical axis. A projection display device uses the zoom lens.

21 Claims, 5 Drawing Sheets

ZOOM LENS AND PROJECTION DISPLAY DEVICE USING THE ZOOM LENS

TECHNICAL FIELD OF THE INVENTION

The present invention relates to a zoom lens for projecting images, such as in projection television systems, and relates in particular to liquid crystal projection display devices and to projection display devices that use the zoom lens of the present invention.

BACKGROUND OF THE INVENTION

Generally, in zoom lenses used as projection lenses in projection display devices, an aperture diameter corresponding to a liquid crystal projector for providing a bright projected image is desired. Compactness of the zoom lens in order to make the projection-type display device small is also desired. In addition, these zoom lenses need to define optical systems that are telecentric, or nearly telecentric, on the reducing side where the display element, such as a liquid crystal display element, is positioned, and that have appropriately large back focal lengths so that there is sufficient room for a color synthesizing optical system (which would operate as a color separating optical system in the reverse direction) for combining information from different display elements.

In addition, in recent years, with these zoom lenses for use in projection display devices, in accordance with the desire to project large images, for example, large video images, at close range to a large screen, wide-angle projection has been desired. Also, during the past several years, there has been strong demand for making projection display devices compact, and in order to do this, the zoom lens itself must be made compact, as well as shortening the overall length of the zoom lens in order to assure projection of a bright image.

These types of zoom lenses are known, as described, for example, in Japanese Laid-Open Patent Applications 2001-91829, 2004-20765, 2000-137165, 2001-100100, and 2001-324677, and 2002-72094. These applications describe five-group zoom lenses. In order to achieve continuous variations in focal length and simultaneously compensate for movement of the image plane that would otherwise occur, three lens groups undergo coordinated movements along the optical axis. In the above mentioned Japanese Laid-Open Patent Applications 2001-91829 and 2004-20765, the lens groups, from the enlarging side, have negative, positive, positive, positive, and positive refractive powers. In the above mentioned Japanese Laid-Open Patent Applications 2000-137165, 2001-100100, 2001-324677, and 2002-72094, the lens groups, from the enlarging side, have negative, positive, positive, negative, and positive refractive powers.

The zoom lenses described in Japanese Laid-Open Patent Application 2001-91829 have an f-number of 2.0 at maximum aperture diameter at the wide-angle end, which is relatively dark, and overall lengths that fail to satisfy the demand of recent years for shortening the lens system. Also, it is desirable that the projection angle, that is, the field angle on the enlarging side, be larger.

The zoom lenses of Japanese Laid-Open Patent Application 2004-20765 do provide for a brighter image with an f-number of 1.73 at the wide-angle end. However, the overall length of the lens system fails to sufficiently satisfy the requirements of recent years of shortening the lens system.

With regard to zoom lenses of Japanese Laid-Open Patent Application 2000-137165, when an f-number of 2.0 is provided at the wide-angle end, the images are relatively dark. In addition, when an f-number of 1.7 at the wide-angle end is provided, the requirements of recent years of shortening the lens system are not adequately satisfied. Furthermore, it is desirable that the picture angle, that is, the field angle on the enlarging side, be larger than the fifty degrees taught in Japanese Laid-Open Patent Application 2000-137165.

With regard to zoom lenses of Japanese Laid-Open Patent Application 2001-100100, when an f-number of 2.0 at the wide-angle end is provided, the images are relatively dark. In addition, when an f-number of 1.84 is provided, the requirements of recent years of shortening the lens system are not adequately satisfied.

With regard to zoom lenses of Japanese Laid-Open Patent Application 2001-324677, the f-number at the wide-angle end is 1.5. However, the requirements of recent years of shortening the lens system are not adequately satisfied. Furthermore, it is desirable that the picture angle, that is, the field angle on the enlarging side, be larger than the forty-eight degrees taught in Japanese Laid-Open Patent Application 2001-324677.

Japanese Laid-Open Patent Application 2002-72094 achieves superior compactness in terms of the overall length of the zoom lenses described, but includes the use of an aspheric surface. Additionally, the zoom lenses are relatively dark with an f-number at maximum aperture at the wide-angle end of 1.73, and it is desirable that a wider picture angle, that is, field angle on the enlarging side be provided.

As can be understood from these conventional examples, it is extremely difficult to shorten the overall length of such zoom lenses while simultaneously achieving a bright image and a large angle of projection of a projected image, which is defined by the field angle, or picture angle, on the enlarging side of the zoom lens.

BRIEF SUMMARY OF THE INVENTION

The present invention relates to a zoom lens having a short overall length that can be constructed with only five lens groups, only three of which move during zooming, that can provide favorable correction of aberrations, that can provide a bright image, and that can provide an appropriate back focal length and back focus distance. In addition, the present invention relates to a projection display device that uses such a zoom lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
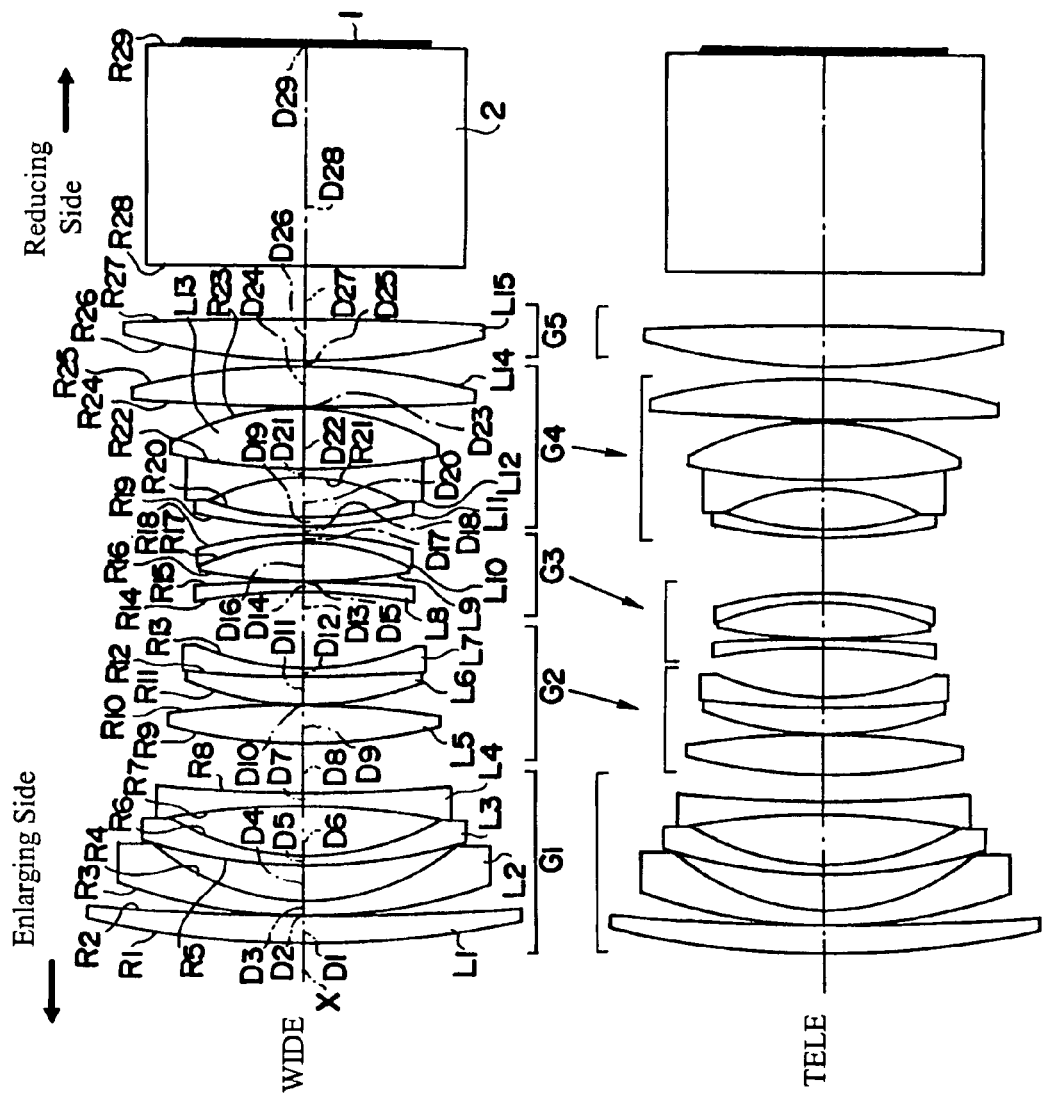
FIG. 1 shows cross-sectional views of Embodiment 1 of the present invention at the wide-angle end (WIDE) and at the telephoto end (TELE)

A general description of the zoom lens of the present invention that pertains to the three disclosed embodiments of the invention will first be described with reference to FIG. 1 that shows Embodiment 1 of the present invention at the wide-angle end (WIDE) and at the telephoto end (TELE). The enlarging side of the zoom lens is on the left side as shown in FIG. 1 and the reducing side of the zoom lens is on the right side as shown in FIG. 1. In FIG. 1, lens elements are referenced by the letter L followed by a number denoting their order from the enlarging side of the zoom lens along the optical axis X, from L1 to L15. The radii of curvature of the optical surfaces are referenced by the letter R followed by a number denoting their order from the enlarging side of the zoom lens, from R1 to R29. The on-axis surface spacings along the optical axis X of the optical surfaces are referenced by the letter D followed by a number denoting their order from the enlarging side of the zoom lens, from D1 to D29. In the same manner, five lens groups are labeled G1–G5, in order from the enlarging side of the zoom lens, and the optical components belonging to each lens group are indicated by brackets adjacent the labels G1–G5.

In the zoom lens of the present invention, the first and fifth lens groups, G1 and G5, are fixed during zooming, and zooming is performed by moving the second, third, and fourth lens groups, G2, G3, and G4, respectively, along the optical axis X. As shown in FIG. 1, downwardly directed arrows indicate generally the locus of points of the direction of movement along the optical axis X of the three lens groups that move during zooming from the wide-angle end to the telephoto end of the zoom range in order to achieve continuous variations in focal length and simultaneously compensate for movement of the image plane that would otherwise occur. As shown in FIG. 1, in the zoom lens of the present invention, the second, third, and fourth lens groups, G2, G3, and G4 move along the optical axis X in coordinated movements continuously in the same direction along the optical axis X during zooming, specifically toward the enlarging side during zooming. The first lens group is movable during focusing.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

In the zoom lens of the present invention: the first lens group G1 has negative refractive power; the second lens group G2 has positive refractive power; the third lens group G3 has positive refractive power; the fourth lens group G4 has a refractive power so that the absolute value of the refractive power of the fourth lens group G4 is much less (i.e., weaker) than the absolute value of the refractive power of each of the first lens group, the second lens group, the third lens group, and the fifth lens group; and the fifth lens group G5 has positive refractive power.

In addition, the fifth lens group G5, which has positive refractive power, is formed as a single lens element that is also a single lens component. Also, the fourth lens group G4 includes, in order from the enlarging side, a lens component that is a lens element having a meniscus shape, negative refractive power, and with its convex surface on the enlarging side, a lens component that includes a lens element having negative refractive power and a lens element having positive refractive power that are cemented together, and a lens component that is a lens element having positive refractive power. This construction helps to ensure a short overall length of the zoom lens.

Furthermore, the zoom lens of the present invention satisfies the following Conditions (1)–(6):

| | |
|---|---|
| $F_{NO} < 2.0$ | Condition (1) |
| $F_{NO} \cdot (LL/Bf) < 5.25$ | Condition (2) |
| $f2/f3 < 1.0$ | Condition (3) |
| $0.8 < f23/fw < 1.4$ | Condition (4) |
| $4.5 < |f4/fw|$ | Condition (5) |
| $1.6 < f5/fw < 2.8$ | Condition (6) | where
$F_{NO}$ is the f-number of the zoom lens at the wide-angle end;
Bf is the air-equivalent back focus distance of the zoom lens at the wide-angle end;
LL is the overall length of the zoom lens;
f2 is the focal length of the second lens group G2;
f3 is the focal length of the third lens group G3;
f23 is the focal length of the combination of the second lens group G2 and the third lens group G3 at the wide-angle end;
fw is the focal length of the zoom lens at the wide-angle end;
f4 is the focal length of the fourth lens group G4; and
f5 is the focal length of the fifth lens group G5.

Satisfying Condition (1) ensures a large aperture lens is used, which enables good optical performance, an appropriate back focal length and back focus distance at all focal lengths used, and ensures obtaining a short overall length of the zoom lens.

Condition (2) relates to the use of the zoom lens in a projection display device of the present invention that uses an image source and a light source where the image source modulates the light from the light source and the zoom lens focuses the modulated light so as to form a real image of an object represented by the image source on, for example, a screen. In such projection display devices, the zoom lens operates as a projection lens. The image source may include one or more display elements, such as light valves, for example, liquid crystal light valves, so that the projection display device is, for example, a liquid crystal video projector.

As shown in FIG. 1, the zoom lens of the present invention includes a representative glass block 2 corresponding to a color synthesizing optical system (which would operate as a color separating optical system in the reverse direction) for combining information from different display elements, represented by the single display element 1 of FIG. 1. The display element 1 may be a liquid crystal display panel. Generally, a liquid crystal video projector is so constructed that a collimated light beam from the light source (not shown) is separated into three primary colors of R, G, B by a color separating optical system (not shown), which may include a dichroic reflective optical system, a lens array, and three liquid crystal display panels for the three primary colors in order to display a full color magnified picture onto a screen (not shown). Each display element 1, which may be a liquid crystal display panel, operates as an image source that modulates the light from the light source, and the zoom lens focuses the modulated light so as to form a real image of an object represented by the image source. Additionally, in particular, the representative glass block 2 may be a dichroic prism system for synthesizing light beams of three primary colors that have been modulated by the three liquid crystal display panels. Also, filters such as a low-pass filter and/or an infrared cut-off filter may be positioned between the fifth lens group G5 and the glass block 2.

In Condition (2), LL is the overall length of the zoom lens, that is, the on-axis distance from the lens element surface on the enlarging side of the zoom lens to the lens element surface on the reducing side of the zoom lens, and Bf is the air-equivalent back focus distance of the zoom lens at the wide-angle end, that is, what the back focus distance would be if the optical path from the lens element surface on the reducing side of the zoom lens to the display element 1 were entirely in air. In order to convert the back focus distance with glass structures in place to the air-equivalent back focus distance, the on-axis distances occupied by each respective glass structure must be divided by the index of refraction of the respective glass structure.

Satisfying Condition (2) assists in obtaining a short overall length of the lens system while allowing a bright image to be projected.

The zoom lens of the present invention is designed to be telecentric, or at least nearly telecentric, on the reducing side. The phrase "nearly telecentric" means that slight variations from exact telecentricity may occur at various image heights at least at some zoom settings but that the variations remain small in comparison to comparable prior zoom lenses that do not include telecentricity in their design criteria.

Ordinarily, a lens system in which the f-number is small and in which the amount of peripheral light is great has lens components with large diameters in order to obtain a bright image. Therefore, there is a tendency for the lens component thicknesses to be relatively large, which tends to make the overall length of the lens system increase. In particular, when the lens system is telecentric or nearly telecentric on the reducing side, the lens component diameters tend to become large and this results in the lens component thicknesses being large. If Condition (2) is not satisfied, it becomes difficult to simultaneously provide a bright lens system and a lens system having a short overall length.

Moreover, in the zoom lenses disclosed in Japanese Laid-Open Patent Applications 2001-91829, 2004-20765, 2000-137165, 2001-100100, and 2001-324677, discussed above, the value of the quantity on the left side of Condition (2) above exceeds 5.25, which results in the overall length of the zoom lens becoming longer, so that these zoom lenses fail to meet the requirement of a short overall length.

Satisfying Condition (3) helps achieve a shorter overall lens system, favorable correction of spherical aberration, and an appropriate back focus distance. If the upper limit of Condition (3) is not satisfied, the refractive power of the third lens group G3 becomes larger, and in addition to making it difficult to correct spherical aberration, this also makes it difficult to assure an appropriate back focus distance.

Satisfying Condition (4), like satisfying Condition (3), helps achieve a shorter overall lens system, favorable correction of spherical aberration, and an appropriate back focus distance. If the upper limit of Condition (4) is not satisfied, the focal length of the combination of the second lens group G2 and the third lens group G3 at the wide-angle end becomes smaller, which causes the amount of movement of each lens group to become larger during zooming, increasing the overall length of the lens system. On the other hand, if the lower limit of Condition (4) is not satisfied, the refractive power of the combination of the second lens group G2 and the third lens group G3 at the wide-angle end becomes larger, which makes it difficult to correct spherical aberration. At the same time, it also becomes difficult to assure an appropriate back focus distance.

In addition, in order to achieve favorable correction of spherical aberration and to assure an appropriate back focus distance while also assuring a shorter overall lens system, the value of the quantity of Condition (4) should preferably be in the range of 0.9 to 1.25.

Satisfying Condition (5) helps achieve favorable aberration correction while maintaining a telecentric or nearly telecentric condition on the reducing side of the zoom lens. The zoom lens of the present invention is constructed so that the absolute value of the refractive power of the fourth lens group G4 is much less than the absolute value of the refractive power of any one of the first lens group G1, the second lens group G2, the third lens group G3, and the fifth lens group G5. The refractive power of the fourth lens group G4 may be positive or negative.

However, because the fifth lens group G5 is formed as a single lens element, which is a single lens component, having positive refractive power, it is especially important that the refractive index of lens groups G4 and G5 be set appropriately. If Condition (5) is not satisfied, it becomes difficult to favorably correct and balance the contributions to spherical aberration, astigmatism, and coma aberration while maintaining the desired telecentric properties on the reducing side.

Satisfying Condition (6) helps achieve favorable aberration correction while maintaining the telecentric properties on the reducing side of the zoom lens, that is, the reducing side of the fifth lens group G5. In the present invention where the fifth lens group is formed as a single lens element, in order to favorably correct the aberrations while maintaining the telecentricity on the reducing side, it is extremely important to appropriately establish the refractive power of this single lens element. If either the upper or lower limit of Condition (6) is not satisfied, it becomes difficult to favorably correct the aberrations while maintaining the telecentric properties on the reducing side of the fifth lens group G5. In addition, in order to better correct aberrations while maintaining the telecentric properties on the reducing side of the fifth lens group G5, it is preferable that the following Condition (6'), which is more stringent than Condition (6), be satisfied:

$1.8 < f5/fw < 2.7$      Condition (6')

The zoom lens of the present invention operates with extremely small movements of the three lens groups, G2, G3, and G4, that move during zooming. In addition, when zooming, it is desirable, as discussed above, that the second lens group G2, the third lens group G3 and the fourth lens group G4 all move continuously toward the enlarging side during zooming from the wide-angle end to the telephoto end of the zoom range. In this manner, by having the three movable lens groups G2, G3, and G4, move continuously in the same direction along the optical axis during zooming, smooth zooming can be accomplished while minimizing the space used for movement of the lens groups. By so doing, it becomes possible to shorten the overall length of the lens system. In this case, it is desirable that the three movable lens groups G2, G3, and G4, move toward the enlarging side during zooming from the wide-angle end to the telephoto end of the zoom range so that the separation between lens groups G2 and G4 increases.

In addition, the second lens group G2 desirably includes, in order from the enlarging side, a first lens component that is a lens element having positive refractive power and a second lens component that is formed of a lens element having positive refractive power and a lens element having negative refractive power that are cemented together. By this construction, because the positive refractive power can be made strong while correcting lateral color, the amount of movement required for zooming can be made small. In addition, by including one cemented lens component in the third lens group G3, lateral color can be favorably corrected.

Three preferred embodiments of the zoom lens of the present invention will now be individually described with reference to the drawings.

Embodiment 1

FIG. 1 shows cross-sectional views of Embodiment 1 of the present invention at the wide-angle end (WIDE) and at the telephoto end (TELE), as discussed above. As shown in FIG. 1, the first lens group G1 includes, in order from the enlarging side: a first lens element L1 having positive refractive power and a meniscus shape with its convex surface on the enlarging side; a second lens element L2 having negative refractive power and a meniscus shape with its convex surface on the enlarging side; a third lens element L3 having negative refractive power and a meniscus shape with its convex surface on the enlarging side; and a fourth lens element L4 having a biconcave shape formed of surfaces with different radii of curvature, with the surface of stronger curvature on the enlarging side. The second lens group G2 includes, in order from the enlarging side: a fifth lens element L5 having a biconvex shape formed of surfaces with different radii of curvature, with the surface of stronger curvature on the enlarging side; and a lens component that includes a sixth lens element L6 having positive refractive power and a meniscus shape with its convex surface on the enlarging side that is cemented to a seventh lens element L7 having negative refractive power and a meniscus shape with its convex surface on the enlarging side.

In addition, the third lens group G3 includes, in order from the enlarging side: an eighth lens element L8 having negative refractive power and a meniscus shape with its convex surface on the reducing side; and a lens component that includes a biconvex ninth lens element L9 having surfaces with different radii of curvature, with the surface of stronger curvature on the reducing side cemented to a tenth lens element L10 having negative refractive power and a meniscus shape with its convex surface on the reducing side. The fourth lens group G4 includes, in order from the enlarging side: an eleventh lens element L11 having negative refractive power and a meniscus shape with its convex surface on the enlarging side; and a lens component that includes a biconcave twelfth lens element L12 having surfaces of different radii of curvature with the surface of stronger curvature on the enlarging side that is cemented to a biconvex thirteenth lens element L13 having surfaces with different radii of curvature with the surface of stronger curvature on the reducing side; and a biconvex fourteenth lens element L14 having surfaces of different radii of curvature with the surface of stronger curvature on the reducing side. The fifth lens group G5 is formed as a single biconvex lens element L15 having surfaces of different radii of curvature with the surface of stronger curvature on the enlarging side.

Table 1 below lists the surface number #, in order from the enlarging side, the radius of curvature R of each surface, the on-axis surface spacing D, as well as the refractive index $N_d$ and the Abbe number $v_d$ (at the d-line of 587.6 nm) of each optical element for Embodiment 1, except that the on-axis surface spacings that vary with zooming are listed in Table 2 below. The numerical values of R and D are based on a normalized focal length of 1.00 at the wide-angle end configuration of the zoom lens of Embodiment 1. Listed in the bottom portion of Table 1 are the focal length f and the f-number $F_{NO}$ at the wide-angle and telephoto ends, and the maximum field angle (picture angle) 2ω at the wide-angle end and at the telephoto end for Embodiment 1.

TABLE 1

| # | R | D | $N_d$ | $v_d$ |
|---|---|---|---|---|
| 1 | 3.146 | 0.169 | 1.77250 | 49.6 |
| 2 | 9.427 | 0.006 | | |
| 3 | 2.060 | 0.079 | 1.70154 | 41.2 |
| 4 | 0.858 | 0.201 | | |
| 5 | 1.857 | 0.060 | 1.62041 | 60.3 |
| 6 | 0.995 | 0.279 | | |
| 7 | −2.803 | 0.062 | 1.51633 | 64.1 |
| 8 | 4.223 | D8 (variable) | | |
| 9 | 1.993 | 0.212 | 1.83481 | 42.7 |
| 10 | −3.674 | 0.012 | | |
| 11 | 1.234 | 0.149 | 1.83400 | 37.2 |
| 12 | 3.775 | 0.053 | 1.48749 | 70.2 |
| 13 | 0.952 | D13 (variable) | | |
| 14 | −2.008 | 0.050 | 1.51742 | 52.4 |
| 15 | −6.818 | 0.006 | | |
| 16 | 2.042 | 0.226 | 1.58913 | 61.2 |
| 17 | −0.881 | 0.052 | 1.80518 | 25.4 |
| 18 | −1.420 | D18 (variable) | | |
| 19 | 1.750 | 0.050 | 1.62004 | 36.3 |
| 20 | 1.035 | 0.243 | | |
| 21 | −0.727 | 0.044 | 1.84666 | 23.8 |
| 22 | 2.142 | 0.354 | 1.58913 | 61.2 |
| 23 | −0.973 | 0.007 | | |
| 24 | 7.154 | 0.242 | 1.83400 | 37.2 |
| 25 | −2.297 | D25 (variable) | | |
| 26 | 2.318 | 0.238 | 1.83400 | 37.2 |
| 27 | −17.866 | 0.321 | | |
| 28 | ∞ | 1.252 | 1.51680 | 64.2 |
| 29 | ∞ | 0.000 | | |
| f = 1.00–1.20 | $F_{NO}$ = 1.55–1.82 | 2ω = 62.0°–52.4° | | |

In the zoom lens of Embodiment 1, lens groups G2, G3, and G4 move to vary the separations of the five lens groups during zooming. In particular, these three lens groups continuously move along the optical axis X toward the enlarging side during zooming to the telephoto end of the zoom range. Therefore, the values of the on-axis spacings D8, D13, D18, and D25 vary. Table 2 below lists the values of the variables D8, D13, D18, and D25 (i.e., the group spacings) at the wide-angle end (having a zoom ratio of 1.00) and at the telephoto end (having a zoom ratio of 1.20).

TABLE 2

| Zoom ratio | D8 | D13 | D18 | D25 |
|---|---|---|---|---|
| 1.00 | 0.288 | 0.472 | 0.044 | 0.028 |
| 1.20 | 0.134 | 0.300 | 0.324 | 0.074 |

As set forth in Table 3 below, the zoom lens of Embodiment 1 of the present invention satisfies all of Conditions (1) through (6) above. In Table 3, the value for Condition (2) is based on the overall length LL of the zoom lens being 3.626.

TABLE 3

| Condition No. | Condition | Value |
|---|---|---|
| (1) | $F_{NO} < 2.0$ | 1.55 |
| (2) | $F_{NO} \cdot (LL/Bf) < 5.25$ | 4.904 |
| (3) | $f2/f3 < 1.0$ | 0.549 |
| (4) | $0.8 < f23/fw < 1.4$ | 1.108 |
| (5) | $4.5 < |f4/fw|$ | 885.877 |
| (6) | $1.6 < f5/fw < 2.8$ | 2.473 |

Figures 3A, 3B, 3C, 3D:
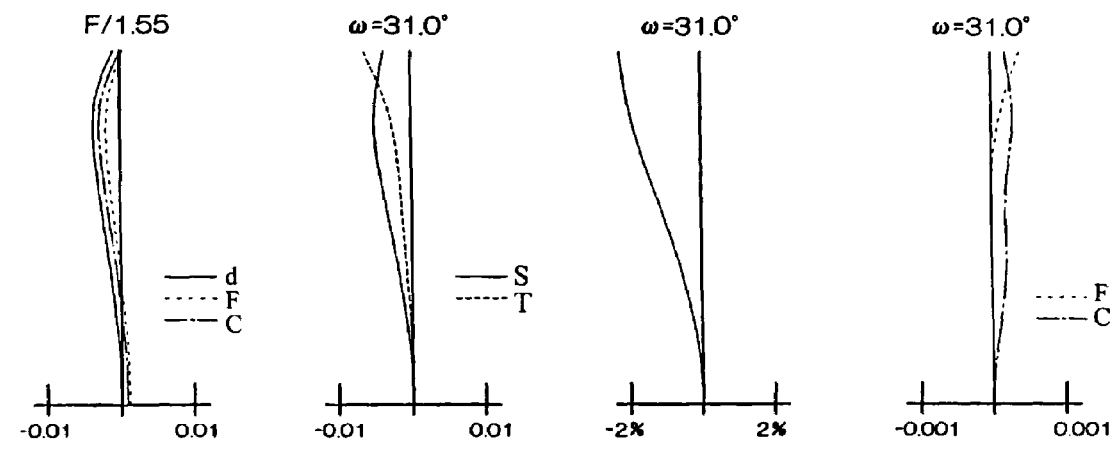
FIGS. 3A–3D show the spherical aberration, astigmatism, distortion, and lateral color, respectively, of the zoom lens according to Embodiment 1 at the wide-angle end.
Figures 3E, 3F, 3G, 3H:
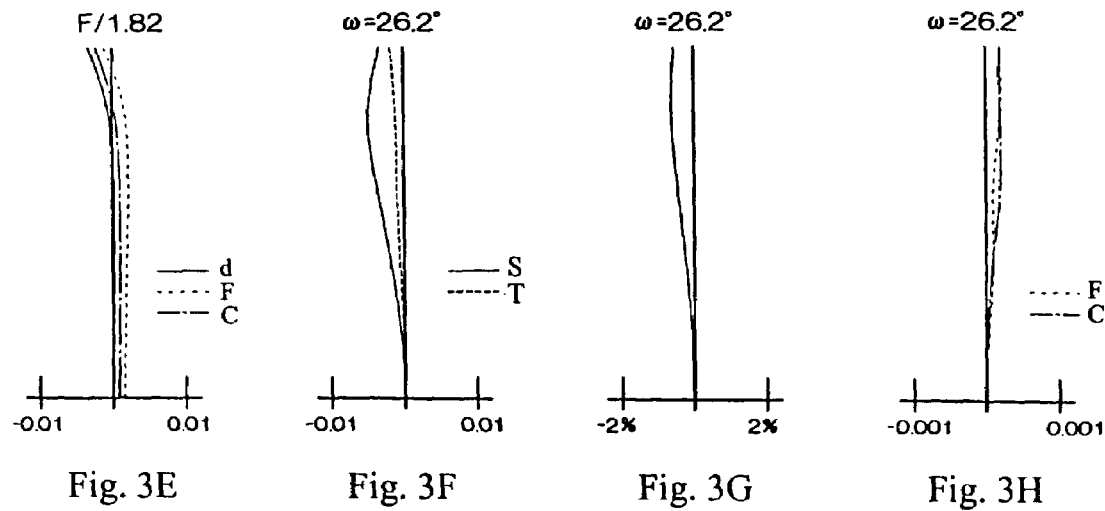
FIGS. 3E–3H show the spherical aberration, astigmatism, distortion, and lateral color, respectively, of the zoom lens according to Embodiment 1 at the telephoto end.

FIGS. 3A–3D show the spherical aberration, astigmatism, distortion, and lateral color, respectively, of the zoom lens of Embodiment 1 at the wide-angle end with a zoom ratio of 1.00. FIGS. 3E–3H show the spherical aberration, astigmatism, distortion, and lateral color, respectively, of the zoom lens of Embodiment 1 at the telephoto end with a zoom ratio of 1.20. In FIGS. 3A and 3E, the spherical aberration (in mm) is shown for the wavelengths 587.6 nm (the d-line), 486.1 nm (the F-line), and 656.3 nm (the C-line), and the f-number is shown. In the remaining figures, ω is the half-field angle. In FIGS. 3B and 3F, the astigmatism (in mm) is shown for both the sagittal image surface S and the tangential image surface T and is measured at 587.6 nm (the d-line). In FIGS. 3C and 3G, distortion (in per cent) is measured at 587.6 nm (the d-line). In FIGS. 3D and 3H, the lateral color (in mm) is shown for the wavelengths 486.1 nm (the F-line) and 656.3 nm (the C-line) relative to 587.6 nm (the d-line). Moreover, FIGS. 3A–3H are based on the zoom lens being set to provide a projection magnification of eighty.

As is clear from the above descriptions, tables, and referenced figures, Embodiment 1 of the present invention provides favorable aberration correction over the entire range of zoom, a wide picture angle or field angle, bright imaging, and an appropriate back focal length and back focus distance in a zoom lens with a relatively short overall length.

Embodiment 2

Embodiment 2 is very similar to Embodiment 1 and uses the same number of lens elements. Because Embodiment 2 is very similar to Embodiment 1, only the differences between Embodiment 2 and Embodiment 1 will be explained for Embodiment 2. Embodiment 2 differs from Embodiment 1 in its lens element configuration by having different radii of curvature of the lens surfaces, different optical element surface spacings, and some different refractive indexes and Abbe numbers.

Table 4 below lists the surface number #, in order from the enlarging side, the radius of curvature R of each surface, the on-axis surface spacing D, as well as the refractive index $N_d$ and the Abbe number $v_d$ (at the d-line of 587.6 nm) of each optical element for Embodiment 2, except that the on-axis surface spacings that vary with zooming are listed in Table 5 below. The numerical values of R and D are based on a normalized focal length of 1.00 at the wide-angle end configuration of the zoom lens of Embodiment 2. Listed in the bottom portion of Table 4 are the focal length f and the f-number $F_{NO}$ at the wide-angle and telephoto ends, and the maximum field angle (picture angle) 2ω at the wide-angle end and at the telephoto end for Embodiment 2.

TABLE 4

| # | R | D | $N_d$ | $v_d$ |
|---|---|---|---|---|
| 1 | 2.866 | 0.188 | 1.71300 | 53.9 |
| 2 | 9.844 | 0.006 | | |
| 3 | 2.002 | 0.075 | 1.80610 | 40.9 |
| 4 | 0.842 | 0.186 | | |
| 5 | 1.640 | 0.065 | 1.56384 | 60.7 |
| 6 | 0.973 | 0.293 | | |
| 7 | −2.387 | 0.061 | 1.48749 | 70.2 |
| 8 | 6.212 | D8 (variable) | | |
| 9 | 1.784 | 0.220 | 1.83481 | 42.7 |
| 10 | −4.216 | 0.006 | | |
| 11 | 1.231 | 0.149 | 1.83400 | 37.2 |
| 12 | 3.146 | 0.054 | 1.48749 | 70.2 |
| 13 | 0.877 | D13 (variable) | | |
| 14 | −1.988 | 0.050 | 1.51742 | 52.4 |
| 15 | −6.698 | 0.007 | | |
| 16 | 1.966 | 0.228 | 1.62041 | 61.2 |
| 17 | −0.910 | 0.054 | 1.80518 | 25.4 |
| 18 | −1.510 | D18 (variable) | | |
| 19 | 1.528 | 0.052 | 1.62004 | 36.3 |
| 20 | 0.957 | 0.262 | | |
| 21 | −0.669 | 0.052 | 1.84666 | 23.8 |
| 22 | 3.213 | 0.346 | 1.58913 | 61.2 |
| 23 | −0.926 | 0.006 | | |
| 24 | 11.582 | 0.245 | 1.83481 | 42.7 |
| 25 | −1.997 | D25 (variable) | | |
| 26 | 2.294 | 0.231 | 1.83400 | 37.2 |
| 27 | −24.099 | 0.325 | | |
| 28 | ∞ | 1.252 | 1.51680 | 64.2 |
| 29 | ∞ | 0.000 | | |
| f = 1.00–1.20 | $F_{NO}$ = 1.55–1.82 | 2ω = 62.0°–52.4° | | |

In the zoom lens of Embodiment 2, lens groups G2, G3, and G4 move to vary the separations of the five lens groups during zooming. In particular, these three lens groups continuously move along the optical axis X toward the enlarging side during zooming to the telephoto end of the zoom range. Therefore, the values of the on-axis spacings D8, D13, D18, and D25 vary. Table 5 below lists the values of the variables D8, D13, D18, and D25 (i.e., the group spacings) at the wide-angle end (having a zoom ratio of 1.00) and at the telephoto end (having a zoom ratio of 1.20).

TABLE 5

| Zoom ratio | D8 | D13 | D18 | D25 |
|---|---|---|---|---|
| 1.00 | 0.258 | 0.450 | 0.048 | 0.030 |
| 1.20 | 0.104 | 0.290 | 0.312 | 0.080 |

As set forth in Table 6 below, the zoom lens of Embodiment 2 of the present invention satisfies all of Conditions (1)

through (6) above. In Table 6, the value for Condition (2) is based on the overall length LL of the zoom lens being 3.626.

TABLE 6

| Condition No. | Condition | Value |
|---|---|---|
| (1) | $F_{NO} < 2.0$ | 1.55 |
| (2) | $F_{NO} \cdot (LL/Bf) < 5.25$ | 4.886 |
| (3) | $f2/f3 < 1.0$ | 0.611 |
| (4) | $0.8 < f23/fw < 1.4$ | 1.111 |
| (5) | $4.5 < |f4/fw|$ | 41.588 |
| (6) | $1.6 < f5/fw < 2.8$ | 2.521 |

Figures 4A, 4B, 4C, 4D:
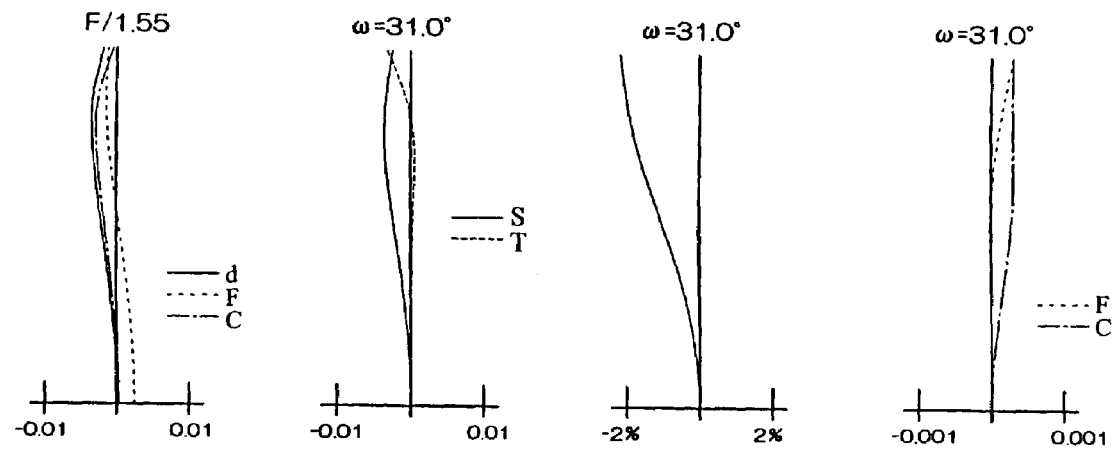
FIGS. 4A–4D show the spherical aberration, astigmatism, distortion, and lateral color, respectively, of the zoom lens according to Embodiment 2 at the wide-angle end.
Figures 4E, 4F, 4G, 4H:
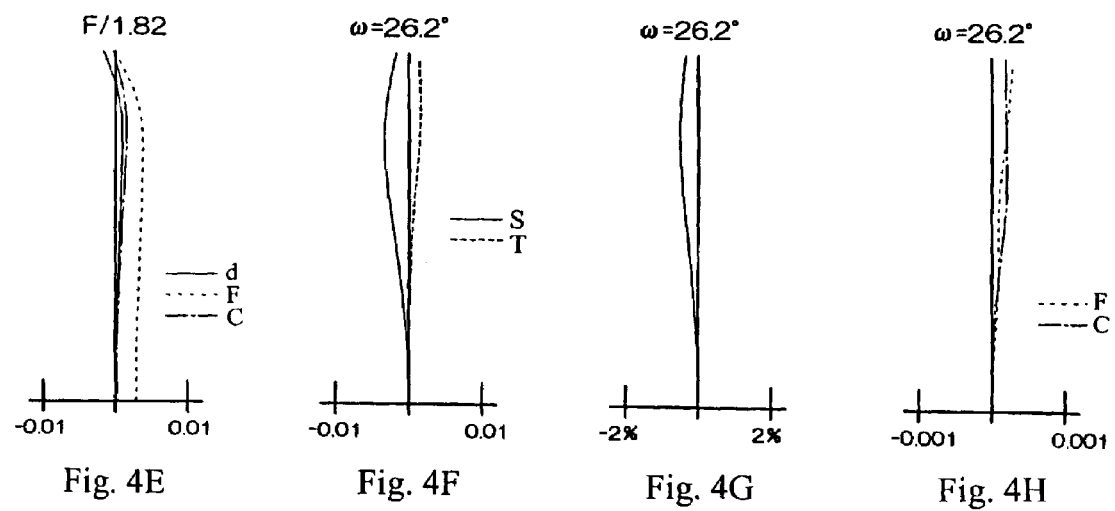
FIGS. 4E–4H show the spherical aberration, astigmatism, distortion, and lateral color, respectively, of the zoom lens according to Embodiment 2 at the telephoto end.

FIGS. 4A–4D show the spherical aberration, astigmatism, distortion, and lateral color, respectively, of the zoom lens of Embodiment 2 at the wide-angle end with a zoom ratio of 1.00. FIGS. 4E–4H show the spherical aberration, astigmatism, distortion, and lateral color, respectively, of the zoom lens of Embodiment 2 at the telephoto end with a zoom ratio of 1.20. In FIGS. 4A and 4E, the spherical aberration (in mm) is shown for the wavelengths 587.6 nm (the d-line), 486.1 nm (the F-line), and 656.3 nm (the C-line), and the f-number is shown. In the remaining figures, ω is the half-field angle. In FIGS. 4B and 4F, the astigmatism (in mm) is shown for both the sagittal image surface S and the tangential image surface T and is measured at 587.6 nm (the d-line). In FIGS. 4C and 4G, distortion (in per cent) is measured at 587.6 nm (the d-line). In FIGS. 4D and 4H, the lateral color (in mm) is shown for the wavelengths 486.1 nm (the F-line) and 656.3 nm (the C-line) relative to 587.6 nm (the d-line). Moreover, FIGS. 4A–4H are based on the zoom lens being set to provide a projection magnification of eighty.

As is clear from the above descriptions, tables, and referenced figures, Embodiment 2 of the present invention provides favorable aberration correction over the entire range of zoom, a wide picture angle or field angle, bright imaging, and an appropriate back focal length and back focus distance in a zoom lens with a relatively short overall length.

Embodiment 3

Figure 2:
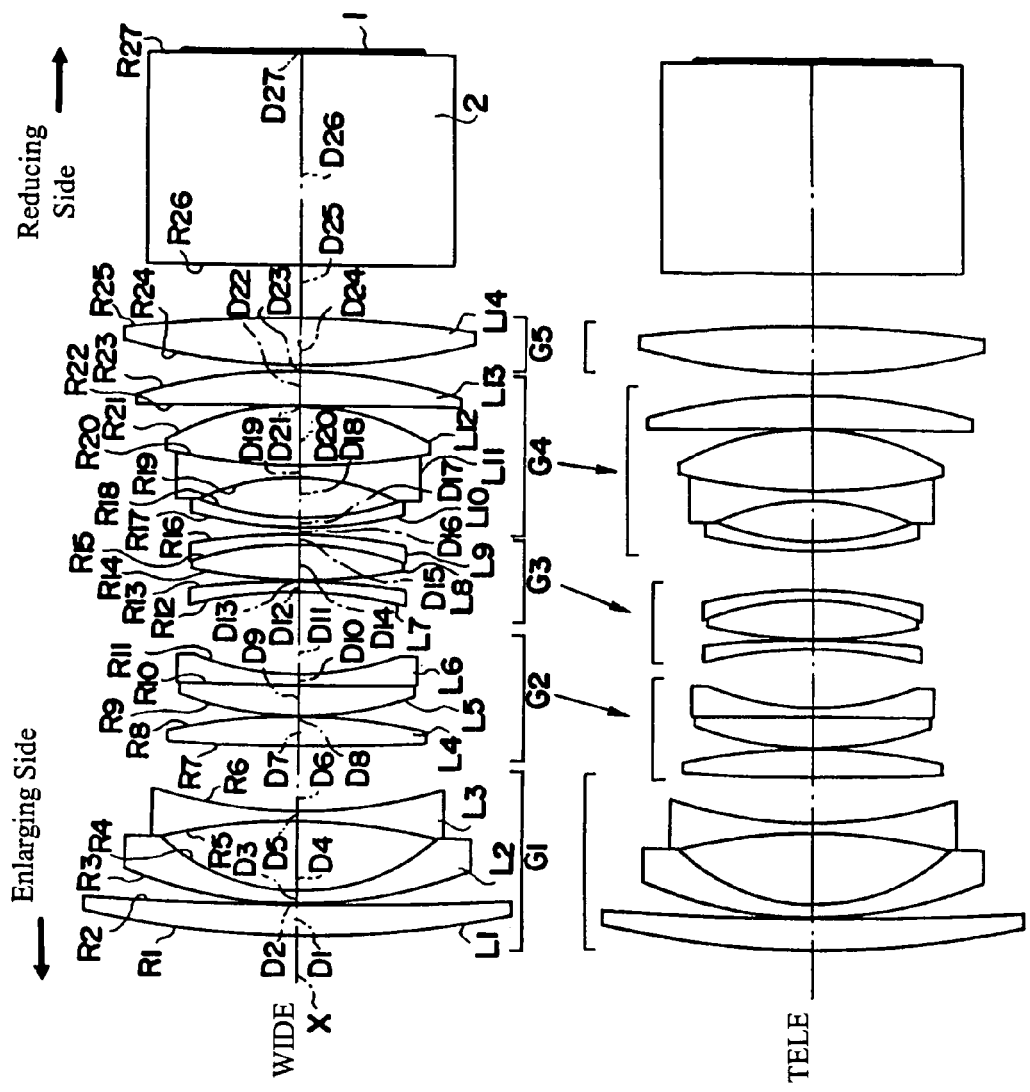
FIG. 2 shows cross-sectional views of Embodiment 3 of the present invention at the wide-angle end (WIDE) and at the telephoto end (TELE)

FIG. 2 shows cross-sectional views of Embodiment 3 of the present invention at the wide-angle end (WIDE) and at the telephoto end (TELE). Embodiment 3 is very similar to Embodiment 1. Because Embodiment 3 is very similar to Embodiment 1, only the differences between Embodiment 3 and Embodiment 1 will be explained for Embodiment 3.

A primary difference between Embodiments 1 and 2 versus Embodiment 3 is that in Embodiment 3 the first lens group G1 includes only three lens elements that are lens components rather than four lens elements that are lens components. In particular, in Embodiment 3, the first lens group G1 includes, in order from the enlarging side: a first lens element L1 having positive refractive power and a meniscus shape with its convex surface on the enlarging side; a second lens element L2 having negative refractive power and a meniscus shape with its convex surface on the enlarging side; and a third lens element L3 that is biconcave having surfaces of different radii of curvature, with the surface of stronger curvature on the reducing side. Each of the three lens elements is also a lens component. The lens element L3 of Embodiment 3 is similar to lens element L4 of Embodiments 1 and 2. Therefore, the total number of surfaces in Embodiment 3 are two less than in each of Embodiments 1 and 2. Additionally, in Embodiment 3, the fourth lens element L4 (which is the enlarging-side lens element of the second lens group G2) is formed of a biconvex lens element having surfaces of different radii of curvature with its surface of stronger curvature on the reducing side, and the thirteenth lens element L13 (which is the reducing-side lens element of the fourth lens group G4) has positive refractive power and a meniscus shape with its convex surface on the reducing side. Also, Embodiment 3 differs from Embodiment 1 in its lens element configuration by having different radii of curvature of the lens surfaces, different optical element surface spacings, and some different refractive indexes and Abbe numbers.

Table 7 below lists the surface number #, in order from the enlarging side, the radius of curvature R of each surface, the on-axis surface spacing D, as well as the refractive index $N_d$ and the Abbe number $v_d$ (at the d-line of 587.6 nm) of each optical element for Embodiment 3, except that the on-axis surface spacings that vary with zooming are listed in Table 8 below. The numerical values of R and D are based on a normalized focal length of 1.00 at the wide-angle end configuration of the zoom lens of Embodiment 3. Listed in the bottom portion of Table 7 are the focal length f and the f-number $F_{NO}$ at the wide-angle and telephoto ends, and the maximum field angle (picture angle) 2ω at the wide-angle end and at the telephoto end for Embodiment 3.

TABLE 7

| # | R | D | $N_d$ | $v_d$ |
|---|---|---|---|---|
| 1 | 3.079 | 0.197 | 1.80400 | 46.6 |
| 2 | 18.700 | 0.006 | | |
| 3 | 1.634 | 0.072 | 1.62041 | 60.3 |
| 4 | 0.789 | 0.397 | | |
| 5 | −2.150 | 0.062 | 1.70154 | 41.2 |
| 6 | 1.652 | D6 (variable) | | |
| 7 | 6.983 | 0.172 | 1.83481 | 42.7 |
| 8 | −2.120 | 0.006 | | |
| 9 | 1.261 | 0.181 | 1.83400 | 37.2 |
| 10 | 30.473 | 0.054 | 1.48749 | 70.2 |
| 11 | 0.971 | D11 (variable) | | |
| 12 | −1.692 | 0.050 | 1.51742 | 52.4 |
| 13 | −4.184 | 0.006 | | |
| 14 | 1.720 | 0.226 | 1.69350 | 53.2 |
| 15 | −1.078 | 0.055 | 1.80518 | 25.4 |
| 16 | −1.726 | D16 (variable) | | |
| 17 | 1.426 | 0.054 | 1.75520 | 27.5 |
| 18 | 0.923 | 0.250 | | |
| 19 | −0.788 | 0.052 | 1.84666 | 23.8 |
| 20 | 1.997 | 0.362 | 1.51633 | 61.2 |
| 21 | −0.985 | 0.006 | | |
| 22 | −33.469 | 0.202 | 1.83400 | 37.2 |
| 23 | −1.993 | D23 (variable) | | |
| 24 | 2.419 | 0.277 | 1.83400 | 37.2 |
| 25 | −5.081 | 0.325 | | |
| 26 | ∞ | 1.250 | 1.51680 | 64.2 |
| 27 | ∞ | 0.000 | | |
| f = 1.00–1.20 | $F_{NO}$ = 1.55–1.79 | 2ω = 59.0°–49.8° | | |

In the zoom lens of Embodiment 3, lens groups G2, G3, and G4 move to vary the separations of the five lens groups during zooming. In particular, these three lens groups continuously move along the optical axis X toward the enlarging side during zooming to the telephoto end of the zoom range. Therefore, the values of the on-axis spacings D6, D11, D16, and D23 vary. Table 8 below lists the values of the variables D6, D11, D16, and D23 (i.e., the group spacings) at the wide-angle end (having a zoom ratio of 1.00) and at the telephoto end (having a zoom ratio of 1.20).

TABLE 8

| Zoom ratio | D6 | D11 | D16 | D23 |
|---|---|---|---|---|
| 1.00 | 0.389 | 0.481 | 0.030 | 0.030 |
| 1.20 | 0.235 | 0.341 | 0.231 | 0.123 |

As set forth in Table 9 below, the zoom lens of Embodiment 3 of the present invention satisfies all of Conditions (1) through (6) above. In Table 9, the value for Condition (2) is based on the overall length LL of the zoom lens being 3.618.

TABLE 9

| Condition No. | Condition | Value |
|---|---|---|
| (1) | $F_{NO} < 2.0$ | 1.55 |
| (2) | $F_{NO} \cdot (LL/Bf) < 5.25$ | 4.882 |
| (3) | $f2/f3 < 1.0$ | 0.791 |
| (4) | $0.8 < f23/fw < 1.4$ | 1.063 |
| (5) | $4.5 < |f4/fw|$ | 5.112 |
| (6) | $1.6 < f5/fw < 2.8$ | 1.999 |

Figure 5A:
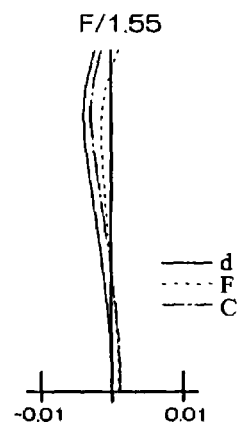
FIGS. 5A–5D show the spherical aberration, astigmatism, distortion, and lateral color, respectively, of the zoom lens according to Embodiment 3 at the wide-angle end.
Figure 5B:
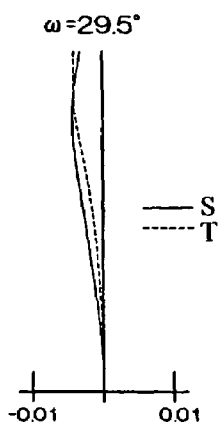
Figure 5C:
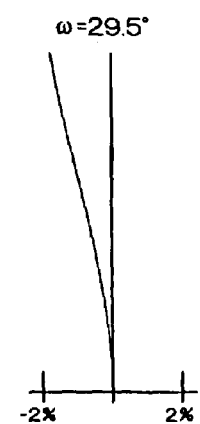
Figure 5D:
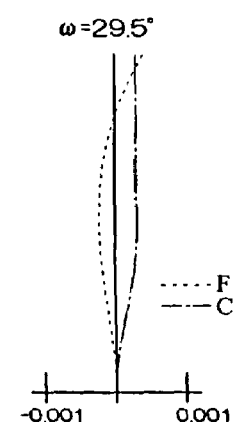
Figure 5E:
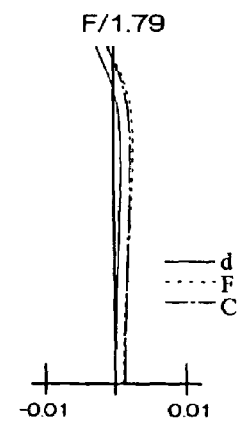
FIGS. 5E–5H show the spherical aberration, astigmatism, distortion, and lateral color, respectively, of the zoom lens according to Embodiment 3 at the telephoto end.
Figure 5F:
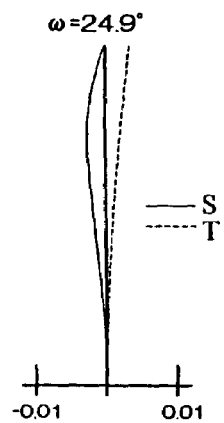
Figure 5G:
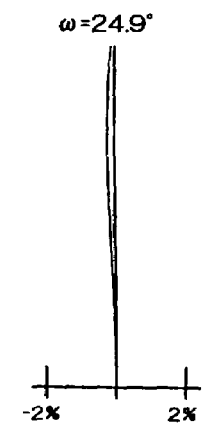
Figure 5H:
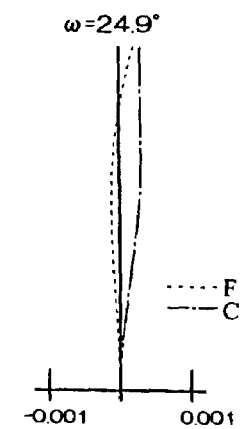

FIGS. 5A–5D show the spherical aberration, astigmatism, distortion, and lateral color, respectively, of the zoom lens of Embodiment 3 at the wide-angle end with a zoom ratio of 1.00. FIGS. 5E–5H show the spherical aberration, astigmatism, distortion, and lateral color, respectively, of the zoom lens of Embodiment 3 at the telephoto end with a zoom ratio of 1.20. In FIGS. 5A and 5E, the spherical aberration (in mm) is shown for the wavelengths 587.6 nm (the d-line), 486.1 nm (the F-line), and 656.3 nm (the C-line), and the f-number is shown. In the remaining figures, ω is the half-field angle. In FIGS. 5B and 5F, the astigmatism (in mm) is shown for both the sagittal image surface S and the tangential image surface T and is measured at 587.6 nm (the d-line). In FIGS. 5C and 5G, distortion (in per cent) is measured at 587.6 nm (the d-line). In FIGS. 5D and 5H, the lateral color (in mm) is shown for the wavelengths 486.1 nm (the F-line) and 656.3 nm (the C-line) relative to 587.6 nm (the d-line). Moreover, FIGS. 5A–5H are based on the zoom lens being set to provide a projection magnification of eighty.

As is clear from the above descriptions, tables, and referenced figures, Embodiment 3 of the present invention provides favorable aberration correction over the entire range of zoom, a wide picture angle or field angle, bright imaging, and an appropriate back focal length and back focus distance in a zoom lens with a relatively short overall length.

The present invention is not limited to the aforementioned embodiments, as it will be obvious that various alternative implementations are possible. For instance, the number of lens elements and lens components in each lens group may be varied. Additionally, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Furthermore, the zoom lens according to the present invention is not limited to the form used as the projection lens of a projection display device that uses transmission-type liquid crystal display elements but may be used as a projection lens for devices that use other light modulation means, such as reflection-type liquid crystal display elements or DMDs. Additionally, the zoom lens of the present invention may be used as an image forming lens in a camera, such as a camera using one of various image pickup tubes, a CCD, or photographic film, such as silver salt film. Furthermore, by constructing the projection display device so that selective exchange may be made of the zoom lens of the present invention with another, for example, wide-angle video projection lens, or with a lens that has an appropriate standard video projection focal length, the freedom of locating the projection display device can be increased. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens comprised of, in order from the enlarging side, as follows:
    a first lens group having negative refractive power, that is movable for focusing, and that is stationary during zooming;
    a second lens group having positive refractive power;
    a third lens group;
    a fourth lens group;
    a fifth lens group having positive refractive power, that consists of a single lens element, and that is stationary during zooming;
wherein
    said second lens group, said third lens group, and said fourth lens group move relative to said first lens group and said fifth lens group during zooming; and
    the follow conditions are satisfied:

$$F_{NO} < 2.0$$

$$F_{NO} \cdot (LL/Bf) < 5.25$$

$$f2/f3 < 1.0$$

$$0.8 < f23/fw < 1.4$$

$$4.5 < |f4/fw|$$

$$1.6 < f5/fw < 2.8$$

where
    $F_{NO}$ is the f-number of the zoom lens at the wide-angle end;
    Bf is the air-equivalent back focus distance of the zoom lens at the wide-angle end;
    LL is the overall length of the zoom lens;
    f2 is the focal length of said second lens group;
    f3 is the focal length of said third lens group;
    f23 is the focal length of the combination of said second lens group and said third lens group at the wide-angle end;
    fw is the focal length of the zoom lens at the wide-angle end;
    f4 is the focal length of said fourth lens group; and
    f5 is the focal length of said fifth lens group.

2. The zoom lens of claim 1, wherein said second lens group, said third lens group, and said fourth lens group move continuously toward one side of the zoom lens during zooming from the wide-angle end to the telephoto end.

3. The zoom lens of claim 2, wherein said second lens group includes, in order from the enlarging side, a first lens component having positive refractive power and a second lens component that is formed of a lens element having positive refractive power and a lens element having negative refractive power that are cemented together.

4. The zoom lens of claim 2, wherein said third lens group includes no more than one lens component that is formed of two lens elements that are cemented together.

5. A projection display device comprising:
the zoom lens of claim 2;
an image source; and
a light source;
wherein
the image source modulates the light from the light source and the zoom lens focuses the modulated light to form a real image of an object represented by the image source.

6. The zoom lens of claim 1, wherein said second lens group includes, in order from the enlarging side, a first lens component having positive refractive power and a second lens component that is formed of a lens element having positive refractive power and a lens element having negative refractive power that are cemented together.

7. The zoom lens of claim 1, wherein said third lens group includes no more than one lens component that is formed of two lens elements that are cemented together.

8. A projection display device comprising:
the zoom lens of claim 1;
an image source; and
a light source;
wherein
the image source modulates the light from the light source and the zoom lens focuses the modulated light so as to form a real image of an object represented by the image source.

9. A zoom lens comprised of, in order from the enlarging side, as follows:
a first lens group having negative refractive power, that is movable for focusing, and that is stationary during zooming;
a second lens group having positive refractive power;
a third lens group having positive refractive power;
a fourth lens group;
a fifth lens group having positive refractive power and that is stationary during zooming; wherein
said second lens group, said third lens group, and said fourth lens group move relative to said first lens group and said fifth lens group during zooming;
said fourth lens group includes, in order from the enlarging side, a lens component having a meniscus shape, having negative refractive power, and having its convex surface on the enlarging side, a lens component that includes a lens element having negative refractive power and a lens element having positive refractive power that are cemented together, and a lens component having positive refractive power;
the absolute value of the refractive power of said fourth lens group is much less than the absolute value of the refractive power of each of said first lens group, said second lens group,
said third lens group, and said filth lens group; and
the follow conditions are satisfied:

$F_{NO} < 2.0$ $F_{NO} \cdot (LL/Bf) < 5.25$ $f2/f3 < 1.0$ $0.8 < f23/fw < 1.4$ $4.5 < |f4/fw|$ $1.6 < f5/fw < 2.8$ where
$F_{NO}$ is the f-number of the zoom lens at the wide-angle end;
Bf is the air-equivalent back focus distance of the zoom lens at the wide-angle end;
LL is the overall length of the zoom lens;
f2 is the focal length of said second lens group;
f3 is the focal length of said third lens group;
f23 is the focal length of the combination of said second lens group and said third lens group at the wide-angle end;
fW is the focal length of the zoom lens at the wide-angle end;
f4 is the focal length of said fourth lens group; and
f5 is the focal length of said fifth lens group.

10. The zoom lens of claim 9, wherein said fifth lens group consists of a single lens element.

11. The zoom lens of claim 10, wherein said second lens group, said third lens group, and said fourth lens group move continuously toward one side of the zoom lens during zooming from the wide-angle end to the telephoto end.

12. The zoom lens of claim 10, wherein said second lens group includes, in order from the enlarging side, a first lens component having positive refractive power and a second lens component that is formed of a lens element having positive refractive power and a lens element having negative refractive power that are cemented together.

13. The zoom lens of claim 10, wherein said third lens group includes no more than one lens component that is formed of two lens elements that are cemented together.

14. A projection display device comprising:
the zoom lens of claim 10;
an image source; and
a light source;
wherein
the image source modulates the light from the light source and the zoom lens focuses the modulated light so as to form a real image of an object represented by the image source.

15. The zoom lens of claim 9, wherein said second lens group, said third lens group, and said fourth lens group move continuously toward one side of the zoom lens during zooming from the wide-angle end to the telephoto end.

16. The zoom lens of claim 15, wherein said third lens group includes no more than one lens component that is formed of two lens elements that are cemented together.

17. A projection display device comprising:
the zoom lens of claim 15;
an image source; and
a light source;
wherein
the image source modulates the light from the light source and the zoom lens focuses the modulated light to form a real image of an object represented by the image source.

18. The zoom lens of claim 9, wherein said second lens group includes, in order from the enlarging side, a first lens component having positive refractive power and a second lens component that is formed of a lens element having positive refractive power and a lens element having negative refractive power that are cemented together.

19. The zoom lens of claim 9, wherein said third lens group includes no more than one lens component that is formed of two lens elements that are cemented together.

20. A projection display device comprising:

the zoom lens of claim 9;

an image source; and a light source;

wherein the image source modulates the light from the light source and the zoom lens focuses the modulated light so as to form a real image of an object represented by the image source.

21. A zoom lens comprised of, in order from the enlarging side, as follows:

a first lens group having negative refractive power, that is movable for focusing, and that is stationary during zooming;

a second lens group having positive refractive power;

a third lens group;

a fourth lens group;

a fifth lens group having positive refractive power and that is stationary during zooming; wherein said second lens group, said third lens group, and said fourth lens group move relative to said first lens group and said fifth lens group during zooming; and the follow conditions are satisfied:

$F_{NO}<2.0$ $F_{NO}\cdot(LL/Bf)<5.25$ $f2/f3<1.0$ $0.8<f23/fw<1.4$ $4.5<|f4/fw|$ $1.6<f5/fw<2.8$ where $F_{NO}$ is the f-number of the zoom lens at the wide-angle end;

Bf is the air-equivalent back focus distance of the zoom lens at the wide-angle end;

LL is the overall length of the zoom lens;

f2 is the focal length of said second lens group;

f3 is the focal length of said third lens group;

f23 is the focal length of the combination of said second lens group and said third lens group at the wide-angle end;

fW is the focal length of the zoom lens at the wide-angle end;

f4 is the focal length of said fourth lens group; and f5 is the focal length of said fifth lens group.

\* \* \* \* \*

UNITED STATES PATENT AND TRADEMARK OFFICE
CERTIFICATE OF CORRECTION

PATENT NO. : 7,227,693 B2
APPLICATION NO. : 11/172851
DATED : June 5, 2007
INVENTOR(S) : Nakazawa et al.

It is certified that error appears in the above-identified patent and that said Letters Patent is hereby corrected as shown below:

Column 6
Lines 47-48, continue same paragraph (i.e, do not begin a new paragraph); and Column 14
Line 28, change "follow" to -- following--.

Signed and Sealed this

Twenty-first Day of August, 2007

JON W. DUDAS
*Director of the United States Patent and Trademark Office*